United States Patent
Agrawal et al.

(10) Patent No.: US 9,208,457 B2
(45) Date of Patent: Dec. 8, 2015

(54) OPTIMIZED FLIGHT PLAN MANAGEMENT SYSTEM

(71) Applicants: Rajat Agrawal, Denver, CO (US); Robert A. Petrie, Jr., San Ramon, CA (US); Jason J. Long, Highlands Ranch, CO (US)

(72) Inventors: Rajat Agrawal, Denver, CO (US); Robert A. Petrie, Jr., San Ramon, CA (US); Jason J. Long, Highlands Ranch, CO (US)

(73) Assignee: THE BOEING COMPANY, Chicago, IL (US)

( * ) Notice: Subject to any disclaimer, the term of this patent is extended or adjusted under 35 U.S.C. 154(b) by 179 days.

(21) Appl. No.: 13/623,581

(22) Filed: Sep. 20, 2012

(65) Prior Publication Data

US 2014/0081569 A1    Mar. 20, 2014

(51) Int. Cl.
| G01C 21/20 | (2006.01) |
| G06Q 10/04 | (2012.01) |
| G08G 5/00 | (2006.01) |

(52) U.S. Cl.
CPC ............ G06Q 10/047 (2013.01); G08G 5/0034 (2013.01); G08G 5/0091 (2013.01); *G01C 21/20* (2013.01)

(58) Field of Classification Search
CPC ... G08G 5/003; G08G 5/0034; G08G 5/0039; G08G 5/0091; G01C 21/20; G06Q 10/047
USPC ................................................. 701/467, 528
See application file for complete search history.

(56) References Cited

U.S. PATENT DOCUMENTS

| 6,134,500 | A | * | 10/2000 | Tang et al. ................... 701/528 |
| 7,966,122 | B2 | | 6/2011 | Flynn et al. |
| 8,244,412 | B2 | | 8/2012 | Myers et al. |
| 2006/0259234 | A1 | * | 11/2006 | Flynn et al. .................. 701/202 |
| 2008/0103645 | A1 | * | 5/2008 | DeMers et al. .................... 701/3 |
| 2009/0005967 | A1 | | 1/2009 | Rumbo et al. |
| 2009/0037091 | A1 | | 2/2009 | Bolt, Jr. |
| 2009/0150012 | A1 | * | 6/2009 | Agam et al. ...................... 701/3 |
| 2009/0204453 | A1 | * | 8/2009 | Cooper et al. ..................... 705/7 |
| 2010/0191458 | A1 | * | 7/2010 | Baker et al. .................. 701/202 |
| 2013/0046422 | A1 | * | 2/2013 | Cabos ............................... 701/3 |

FOREIGN PATENT DOCUMENTS

| DE | 202006005089 U1 | 6/2006 |
| WO | WO2005079179 A1 | 9/2005 |
| WO | WO2011128836 A2 | 10/2011 |

OTHER PUBLICATIONS

The Collins English Dictionary, definition of term "Simulation" http://www.collinsdictionary.com/dictionary/english/simulation.*
Altus, Effective Flight Plans Can Help Airlines Economize, Quarter 03, 2009, Aero Magazine—The Boeing Company.*

(Continued)

*Primary Examiner* — John Q Nguyen
*Assistant Examiner* — Nadeem Odeh
(74) *Attorney, Agent, or Firm* — Yee & Associates, P.C.

(57) ABSTRACT

A method and apparatus for flight planning. Routes from a start point to an end point are identified for a flight of an aircraft from a database of routes. A plurality of different types of routes is present in the database of routes. A number of characteristics of the aircraft are applied to the routes to identify a performance of the aircraft for the routes using a number of weather conditions for the flight. The routes are ranked based on the performance of the aircraft on the routes in meeting a number of goals for the flight to form ranked routes. A portion of the ranked routes are displayed.

20 Claims, 7 Drawing Sheets

(56) References Cited

OTHER PUBLICATIONS

Wikipedia On-Line Encyclopedia, Flight Test, Sep. 2010, Wikipedia: The Free Encyclopedia.*

EP search report, dated Sep. 4, 2014, regarding application EP13182817.0, 8 pages.

European Patent Office Communication, dated Sep. 24, 2015, regarding Application No. EP13182817.0, 8 pages.

* cited by examiner

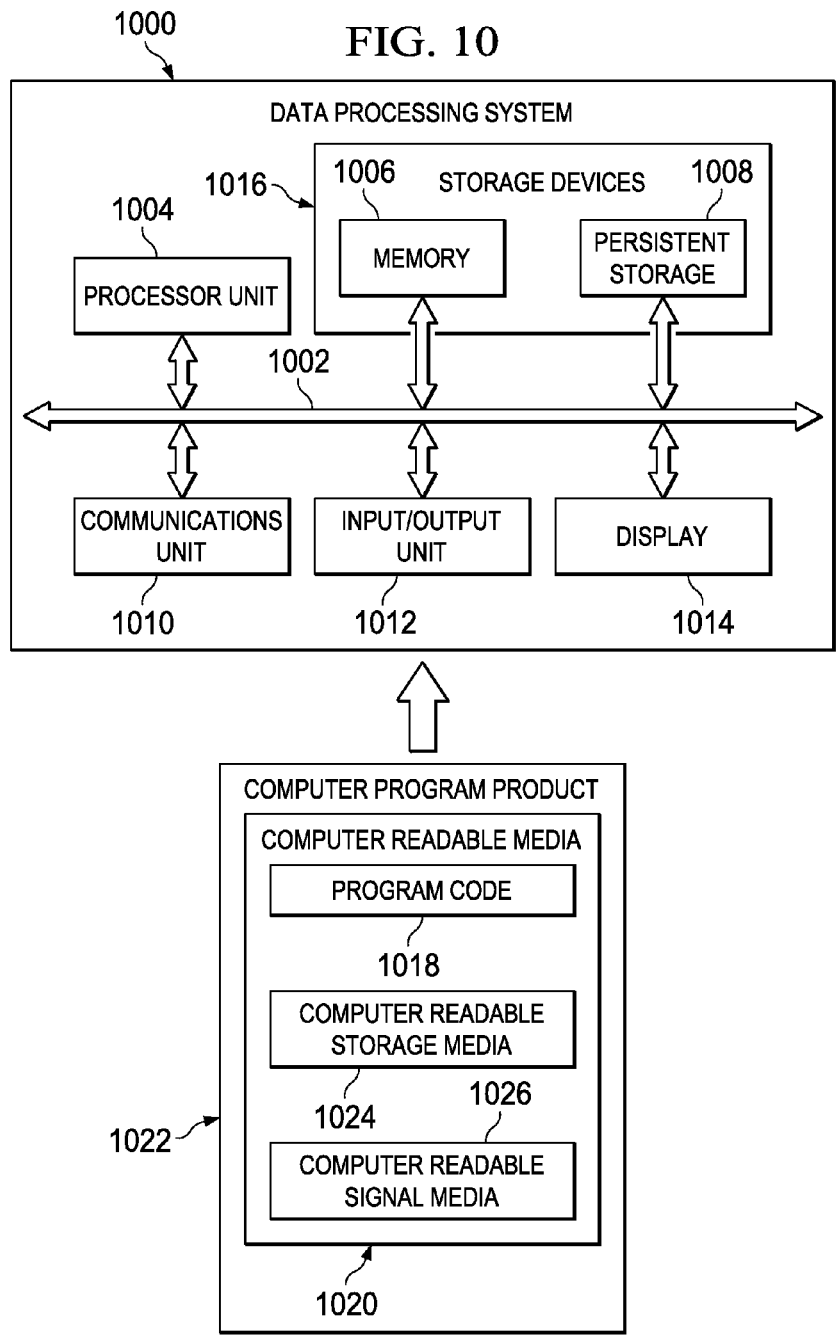

OPTIMIZED FLIGHT PLAN MANAGEMENT SYSTEM

BACKGROUND INFORMATION

1. Field

The present disclosure relates generally to aircraft and, in particular, to flight plans for aircraft. Still more particularly, the present disclosure relates to a method and apparatus for selecting potential flight plans for an aircraft.

2. Background

In operating aircraft, a pilot may generate a flight plan from a start location to a destination location. The flight plan is information about the flight from a start point to an end point. The flight plan may include information such as the flight path. This flight path may be defined using waypoints. Other information may include an estimated time en route, information about the aircraft, alternate airports, information about the passengers, and other suitable information.

In generating a flight plan, a pilot may take into account weather conditions and other circumstances. Oftentimes, the flight plan may include predetermined routes such as airways. These airways may be used even though they may not provide the most direct flight to a destination.

A pilot or other operator, however, may often select a flight plan that has previously been cleared by an air traffic control service. Even though the flight plan may not provide the most direct or desirable route to the destination. The pilot or other operator, however, may select a flight plan that was previously approved by the air traffic control service because of the likelihood that a reuse of the route in the flight plan may be approved.

Other flight plans that have not been previously approved by air traffic control may have more difficulty obtaining approval. Much of the airspace may have restrictions based on altitude, runways, time restrictions, and other constraints. As a result, the flight plan generated by a pilot may be proper with respect to safely flying the aircraft from the start location to the destination location. However, other constraints may result in the flight plan being denied.

However, selecting a previously approved flight plan may not result in a most desirable plan for use by a particular pilot. For example, the pilot may not obtain the desired arrival time, fuel usage, or both when using a previously approved flight plan. Therefore, it would be desirable to have a method and apparatus that takes into account at least some of the issues discussed above, as well as other possible issues.

SUMMARY

In one illustrative embodiment, a method for flight planning is present. Routes from a start point to an end point are identified for a flight of an aircraft from a database of routes. A plurality of different types of routes is present in the database of routes. A number of characteristics of the aircraft are applied to the routes to identify a performance of the aircraft for the routes using a number of weather conditions for the flight. The routes are ranked based on the performance of the aircraft on the routes in meeting a number of goals for the flight to form ranked routes. A portion of the ranked routes are displayed.

In another illustrative embodiment, a method for flight planning is present. Routes from a start point to an end point are identified for a flight of an aircraft from a database of routes. A plurality of different types of routes is present in the database of routes. A number of characteristics of the aircraft is applied to the routes to identify a performance of the aircraft for the routes using a number of weather conditions for the flight. The identified routes are displayed with the performance of the aircraft for the routes.

In yet another illustrative embodiment, an apparatus comprises a flight plan manager. The flight plan manager is configured to identify routes from a start point to an end point for a flight of an aircraft from a database of routes. A plurality of different types of routes is present in the database of routes. The flight plan manager is further configured to apply a number of characteristics of the aircraft to the routes to identify a performance of the aircraft for the routes using a number of weather conditions for the flight. The flight plan manager is further configured to rank the routes based on the performance of the aircraft on the routes in meeting a number of goals for the flight to form ranked routes. The flight plan manager is further configured to display a portion of the ranked routes.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 10 is an illustration of a data processing system in accordance with an illustrative embodiment.

DETAILED DESCRIPTION

The illustrative embodiments recognize and take into account one or more different considerations. For example, the illustrative embodiments recognize and take into account that one issue with pilots tending to select routes that have been previously cleared by air traffic control is that these routes may not differentiate between different types of aircraft for which the plans were cleared. In other words, a pilot is unable to determine whether a previously cleared flight plan will meet performance goals such as speed or fuel usage without more analysis.

Further, the illustrative embodiments recognize and take into account that currently used navigation planning systems do not present an operator with other known routing options such as jet airways structures or air traffic control preferred routes. Further, the illustrative embodiments also recognize and take into account that the weather for the particular altitude of an aircraft may be different from a previously approved flight plan at a different altitude.

Additionally, the weather also may have changed significantly since the plan was approved. As a result, using the same plan even though the plan may be approved may have an undesired impact on the speed of the aircraft, the fuel use, or other factors with respect to the performance of the aircraft.

Thus, the illustrative embodiments provide a method and apparatus for flight planning. In one illustrative embodiment, routes from a start point to an end point for a flight of an aircraft are identified from a database of routes. A plurality of different types of routes is present in the database of routes. A number of characteristics of the aircraft are applied to the route to identify a performance of the aircraft for the routes using a number of weather conditions for the flight. The routes are ranked based on the performance of the aircraft on the routes in meeting a number of goals for the flight to form ranked routes. A portion of the ranked routes are displayed on a display device to the operator.

As used herein, a "number of" when used with reference to items means one or more items. For example, a number of characteristics is one or more characteristics.

Figure 1:
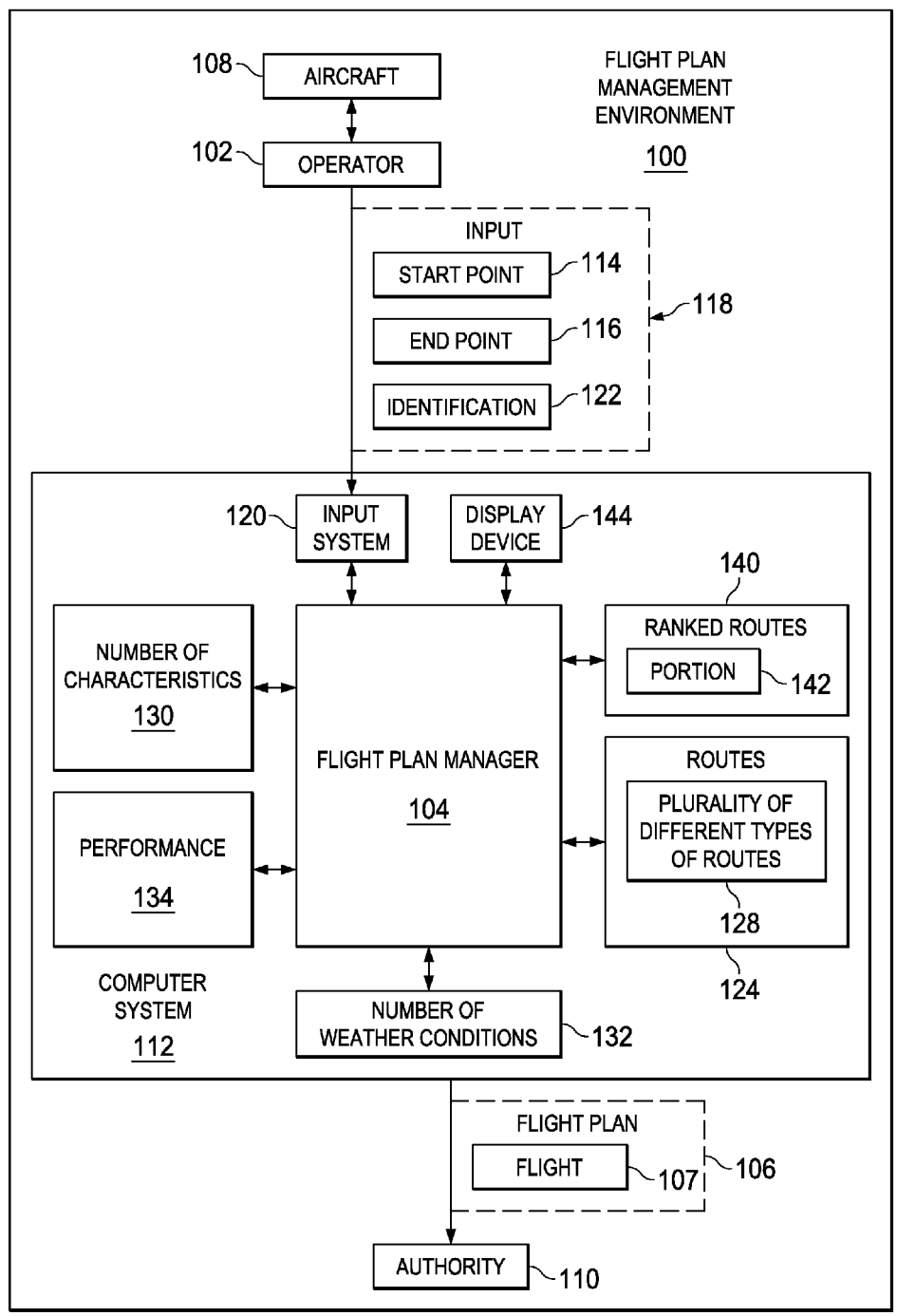
FIG. 1 is an illustration of a block diagram of a flight plan management environment in accordance with an illustrative embodiment.

With reference now to the figures, and in particular, with reference to FIG. 1, an illustration of a block diagram of a flight plan management environment is depicted in accordance with an illustrative embodiment. In this illustrative example, flight plan management environment 100 comprises operator 102.

In this depicted example, operator 102 may use flight plan manager 104 to generate flight plan 106 for flight 107 of aircraft 108. In particular, operator 102 may generate flight plan 106 using flight plan manager 104 and submit flight plan 106 for approval by authority 110. In these illustrative examples, authority 110 may take various forms. In one illustrative example, authority 110 may be an air traffic control center.

As depicted, flight plan manager 104 may be implemented using hardware, software, or a combination of the two. When software is used, the operations performed by flight plan manager 104 may be implemented in program code configured to run on a processor unit. When hardware is employed, the hardware may include circuits that operate to perform the operations in flight plan manager 104.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this depicted example, flight plan manager 104 may be implemented in computer system 112. Computer system 112 is comprised of one or more computers. When more than one computer is present in computer system 112, those computers may communicate with each other via a medium such as a network.

In the illustrative examples, flight plan manager 104 is configured to receive start point 114, end point 116, and identification 122 as part of input 118 from operator 102 using input system 120 in computer system 112. Further, the computers in computer system 112 may be in the same or different geographic locations depending on the particular implementation.

Start point 114 is the start location or origination location for flight 107 of aircraft 108. End point 116 is the end location or destination location for flight 107 of aircraft 108. In some illustrative examples, start point 114 and end point 116 may be locations of airports. In yet other illustrative examples, start point 114 and end point 116 may be other locations on the ground or in the air depending on the particular implementation. In one illustrative example, start point 114 may be an airport, a current position of the aircraft, a waypoint in a current route of the aircraft, and other suitable locations.

Identification 122 is the identification of aircraft 108 for which flight plan 106 is to be generated in this illustrative example. Identification 122 may take various forms. For example, identification 122 may be a tail number, a name, or some other suitable identifier for aircraft 108.

In these illustrative examples, input system 120 may include at least one of a mouse, a keyboard, a trackball, a touch screen, a joystick and other suitable input devices. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

In these illustrative examples, flight plan manager 104 is configured to identify routes 124 from start point 114 to end point 116 for flight 107 of aircraft 108 using input 118. In other words, routes 124 have start point 114 and end point 116. In this illustrative example, routes 124 include plurality of different types of routes 128.

As depicted, flight plan manager 104 identifies number of characteristics 130 of aircraft 108. Additionally, flight plan manager 104 also identifies number of weather conditions 132. Number of weather conditions 132 is one or more weather conditions for flight 107 of aircraft 108.

As depicted, flight plan manager 104 is configured to apply number of characteristics 130 of aircraft 108 to routes 124 to identify performance 134 of aircraft 108 on routes 124 using number of weather conditions 132. In other words, flight plan manager 104 may identify performance 134 of aircraft 108 on each of routes 124 using number of characteristics 130 to identify performance 134 of aircraft 108 on each of routes 124.

Thereafter, flight plan manager 104 may rank routes 124 based on performance 134. In this manner, flight plan manager 104 generates ranked routes 140. Flight plan manager 104 may display portion 142 of ranked routes 140 on display device 144.

Operator 102 may select one of ranked routes 140 in portion 142 displayed on display device 144. The selected route is used to generate flight plan 106 which may be submitted for approval by authority 110 for use in flight 107 of aircraft 108.

In some illustrative examples, flight plan manager 104 may not rank routes 124 based on performance. Instead, flight plan manager 104 may display routes 124 identified for aircraft 108. The display of routes 124 may be displayed with performance 134 on display device 144. The display of routes 124 may be based on other factors other than ranking. For example, the routes may be displayed in groups based on types of routes within plurality of different types of routes 128 for routes 124.

Figure 2:
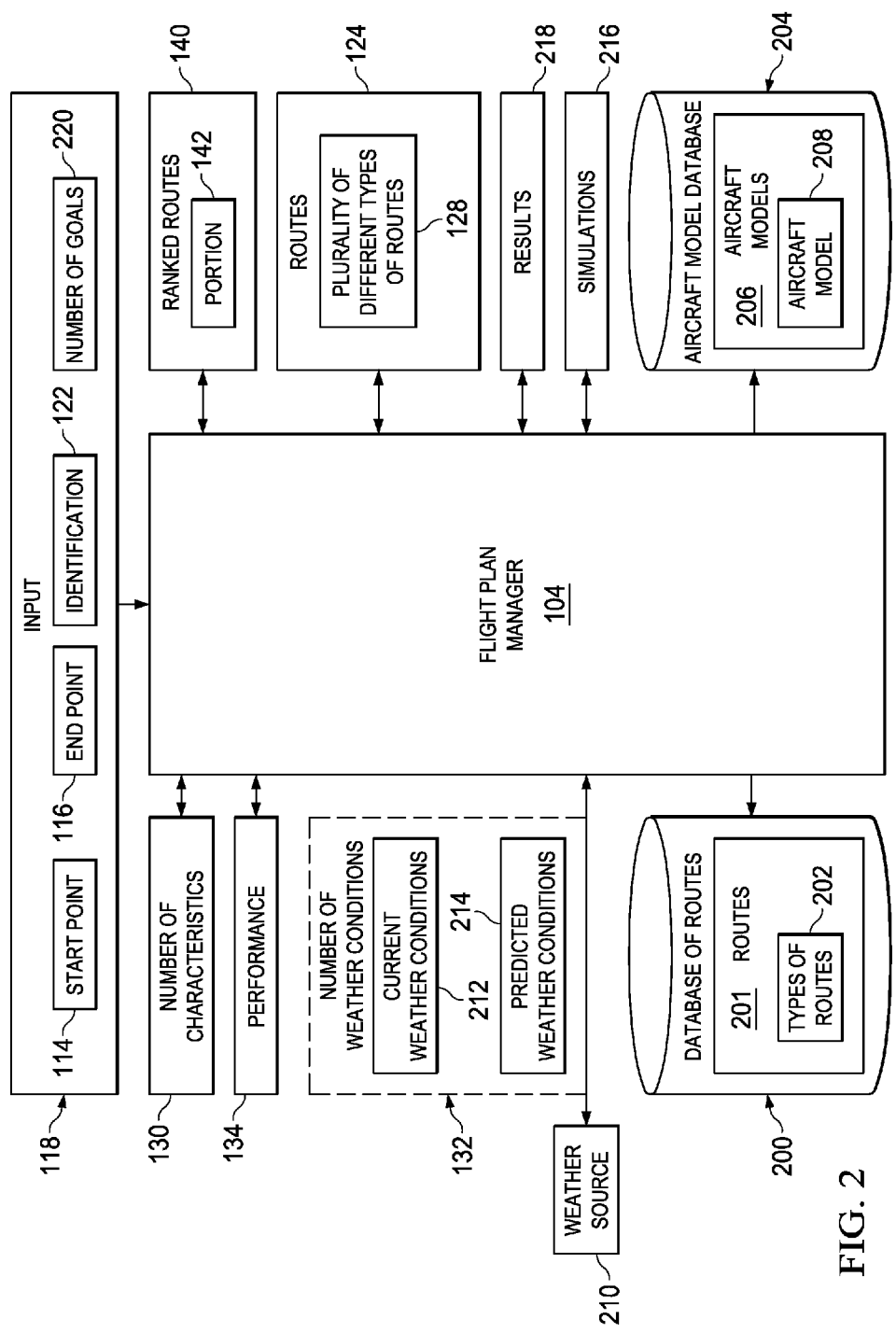
FIG. 2 is an illustration of information flow used to identify routes for consideration in a flight plan in accordance with an illustrative embodiment.

Turning now to FIG. 2, an illustration of information flow used to identify routes for consideration in a flight plan is depicted in accordance with an illustrative embodiment. In this illustrative example, flight plan manager 104 receives input 118 through input system 120 in FIG. 1.

As depicted, routes 124 may be identified by flight plan manager 104 from database of routes 200. Database of routes 200 includes routes 201 that may be classified into types of routes 202. In these illustrative examples, database of routes 200 may be in a single location or multiple locations depending on the particular implementation.

Database of routes 200 may be updated on some periodic basis. Routes 201 in database of routes 200 may be obtained from various sources. For example, routes 201 in database of routes 200 may be obtained from an air traffic control service, a government agency, an airline, a third-party, or some other suitable source.

In this illustrative example, routes 124 may be identified from routes 201 in database of routes 200 based on routes 201 that have start points and end points matching start point 114 and end point 116. In these illustrative examples, routes 124 are comprised of plurality of different types of routes 128. In other words, flight plan manager 104 does not select only one type of route for analysis and consideration if more than one type of route has a start point and an end point that matches start point 114 and end point 116 for flight 107 of aircraft 108 in FIG. 1.

In addition, flight plan manager 104 is configured to identify number of characteristics 130 for aircraft 108 in FIG. 1 using aircraft model database 204. Aircraft model database 204 includes aircraft models 206. These aircraft models may be used to identify the performance of different aircraft.

For example, aircraft model 208 in aircraft models 206 may be identified using identification 122 of aircraft 108 from input 118. Aircraft model 208 may be a model of the type of aircraft identified for aircraft 108 using identification 122. In this illustrative example, aircraft model 208 may be a data structure containing parameters regarding performance 134 of aircraft 108. In other illustrative examples, aircraft model 208 may be a program, equations, or other information that may be used to identify performance 134 of aircraft 108 when running a simulation.

In some illustrative examples, aircraft model 208 may be a model specifically for aircraft 108 and not just for the type of aircraft. In other words, aircraft model 208 may be a model that identifies actual characteristics in number of characteristics 130 for aircraft 108. For example, number of characteristics 130 may include fuel usage, speed, turning capabilities, and other characteristics that aircraft 108 actually has during flight 107 and not just characteristics of the type of aircraft for aircraft 108.

Aircraft model 208 may be generated using a model for the type of aircraft for aircraft 108. This model may be adjusted to take into account actual characteristics. These characteristics may be identified from a history of data collected from prior flights of aircraft 108.

Additionally, number of weather conditions 132 may be received from weather source 210. Number of weather conditions 132 may take the form of at least one of current weather conditions 212 and predicted weather conditions 214. Number of weather conditions 132 may be weather conditions that are expected to be present along each of routes 124 if used in flight plan 106 for flight 107 of aircraft 108.

Weather source 210 may be any source that provides number of weather conditions 132 with a desired level of accuracy. Number of weather conditions 132 may include, for example, wind, precipitation, storms, turbulence, and other suitable weather conditions.

As depicted, flight plan manager 104 applies number of characteristics 130 of aircraft 108 to routes 124 to identify performance 134 of aircraft 108 for routes 124 using number of weather conditions 132 for flight 107 of aircraft 108. For example, flight plan manager 104 runs simulations 216 for routes 124 using number of characteristics 130 of aircraft 108 and number of weather conditions 132 expected along each of routes 124. In other words, a simulation in simulations 216 may be run for each route in routes 124.

Simulations 216 may take into account a number of different conditions about the flight. For example, payload, fuel load, and other conditions may be taken into account in aircraft model 208 of aircraft 108.

Results 218 of simulations 216 may include performance 134 of aircraft 108 for routes 124. In this manner, routes 124 may be ranked using number of goals 220 to form ranked routes 140 and portion 142 of ranked routes 140 may then be displayed for selection by operator 102. In particular, ranking of routes 124 based on performance 134 may be performed based on how performance 134 meets number of goals 220 for flight 107 of aircraft 108. In these illustrative examples, number of goals 220 may be received as part of input 118.

In this manner, ranked routes 140 may be in an order that follows number of goals 220. In this manner, plurality of different types of routes 128 in routes 124 that are ranked to form ranked routes 140 may be considered. As a result, more types of routes may be considered than merely identifying routes that have been previously cleared.

Figure 3:
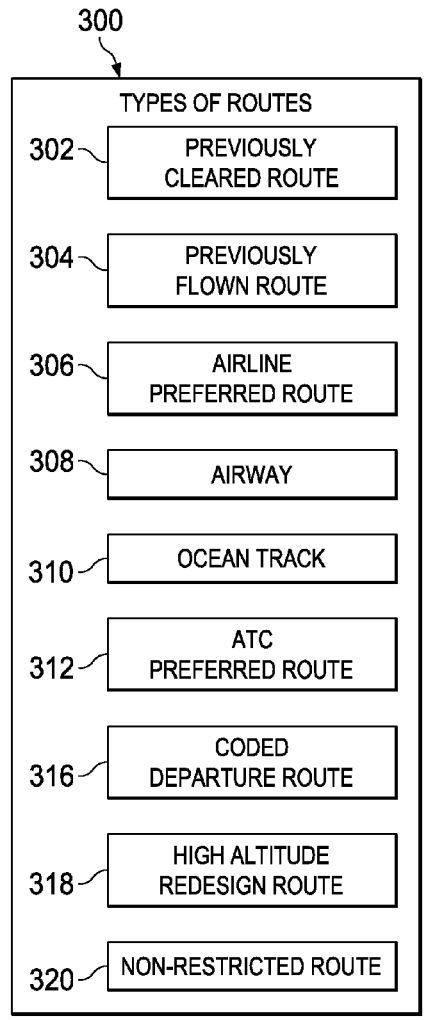
FIG. 3 is an illustration of different types of routes for a flight plan in accordance with an illustrative embodiment.

Turning now to FIG. 3, an illustration of different types of routes for a flight plan is depicted in accordance with an illustrative embodiment. In this illustrative example, types of routes 300 are examples of different types of routes that may be present in types of routes 202 in database of routes 200 in FIG. 2.

Types of routes 300 may include routes of many different types. For example, types of routes 300 may include previously cleared route 302, previously flown route 304, airline preferred route 306, airway 308, ocean track 310, ATC preferred route 312, coded departure route 316, high altitude redesign route 318, non-restricted route 320, and other suitable types of routes.

As depicted, previously cleared route 302 is a route that has been previously cleared by authority 110. This type of route is more likely to be cleared again for future use depending on weather conditions, changes in airspace regulations, and other factors.

Previously flown route 304 is a route previously flown by operator 102. Operator 102 may be a pilot, an airline, or some other organization that operates aircraft 108. Further, previously flown route 304 may be a route specifically flown by aircraft 108 or other aircraft of the same type as aircraft 108.

Airline preferred route 306 is a route that is preferred for use by an airline. Airline preferred route 306 may be for the same or different airline as the one that operates aircraft 108.

In these illustrative examples, airway 308 is a predefined path. Airway 308 may be akin to a three-dimensional highway for aircraft. Airway 308 may be established between a departure airport and a destination airport.

Ocean track 310 is a route that is pre-established over an ocean area. Ocean track 310 may be fixed or may vary depending on other factors.

ATC preferred route 312 is a route for everyday use between cities. ATC preferred route 312 is a route that is preferred for use in a flight plan by an agency such as the Federal Aviation Administration.

In the illustrative examples, coded departure route 316 is a predefined alternative route for flying between pairs of cities. This type of route is an alternative route for a flight when a preferred route is not available due to factors such as weather, traffic, or other constraints.

High altitude redesign route 318 is a route that may be followed using a global positioning system receiver rather than ground-based radio wave transmitters. This type of route may be more flexible, especially in a high altitude airspace environment.

As depicted, non-restricted route 320 is a route that is created by an operator or other entity that is not a published route. A non-restricted route may be one having waypoints created by a pilot.

The examples of types of routes 300 illustrated in FIG. 3 are not meant to limit the type of routes that may be used in types of routes 300. Depending on the particular implementation, other types of routes may be used in addition to or in place of the ones illustrated for types of routes 300.

Figure 4:
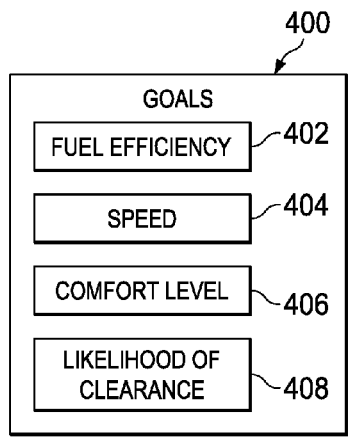
FIG. 4 is an illustration of goals for identifying routes for a flight plan in accordance with an illustrative embodiment.

Turning now to FIG. 4, an illustration of goals for identifying routes for a flight plan is depicted in accordance with an illustrative embodiment. In this illustrative example, goals 400 are examples of goals that may be used in number of goals 220 to rank routes 124 based on performance 134 for routes 124 identified from simulations 216 in FIG. 2.

As depicted, goals 400 may take various forms. For example, goals 400 may include at least one of fuel efficiency 402, speed 404, comfort level 406, likelihood of clearance 408, fuel use, and travel time.

Fuel efficiency 402 is a desired level of fuel efficiency for aircraft 108 that operator 102 desires for flight 107 between start point 114 and end point 116 in FIG. 1. Fuel efficiency 402 may be selected when the cost for flight 107 is a factor in selecting a route for use in flight plan 106 in FIG. 1 in flight 107 of aircraft 108.

In these illustrative examples, speed 404 is another goal in goals 400 that may be selected when the time needed to reach end point 116 is an important consideration. For example, if operator 102 is planning a schedule for multiple flights of aircraft 108 or flights of aircraft 108 and other aircraft, the arrival times for reaching end point 116 may be important in establishing the schedule. A desired level for speed 404 may allow aircraft 108 to reach end point 116 with a desired arrival time.

Comfort level 406 is another goal that may be selected by operator 102. Comfort level 406 may be different for different routes in routes 124. For example, the different routes may involve different altitudes, different weather conditions, and other factors that may affect the level of comfort for aircraft 108.

In these illustrative examples, likelihood of clearance 408 may be another goal for selecting a route from routes 124. If operator 102 has limited time for planning routes, fuel efficiency 402 and speed 404 are not as great of a concern, and identifying routes from routes 124 that are more likely to be cleared by authority 110 may be desired.

The illustration of the examples of goals in goals 400 are only provided as some possible goals that may be used by flight plan manager 104 in ranking routes 124 based on performance 134 of aircraft 108 on routes 124 that meet number of goals 220. Of course, other goals may be used other than those illustrated. In addition, when more than one goal is present in number of goals 220, those goals may be weighted or given priorities.

Figure 5:
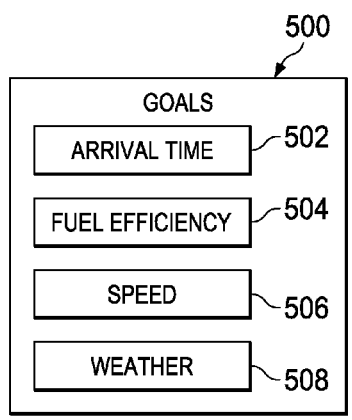
FIG. 5 is an illustration of goals that may be used to rank routes for a flight plan in accordance with an illustrative embodiment.

With reference now to FIG. 5, an illustration of goals that may be used to rank routes for a flight plan is depicted in accordance with an illustrative embodiment. In this illustrative example, goals 500 are examples of goals that may be used to implement number of goals 220 in FIG. 2.

As depicted, goals 500 may take various forms. For example, goals 500 may include arrival time 502, fuel efficiency 504, speed 506, weather 508, and other suitable goals.

As illustrated, arrival time 502 is a desired arrival time for the flight when a particular route is used. In some illustrative examples, arrival time 502 may be selected when particular schedules may be desired for an aircraft.

Fuel efficiency 504 selects a desired fuel efficiency for the flight. Fuel efficiency 504 may be an overall fuel efficiency. In other words, fuel efficiency 504 may be the overall fuel efficiency for the entire flight. In other illustrative examples, fuel efficiency 504 may be identified for different segments or times during a route.

Speed 506 is a desired speed for the aircraft during flight. An operator may select a value for speed 506 to obtain a shorter amount of flying time if fuel efficiency 504 is not as important.

As depicted, weather 508 may be a goal to avoid certain types of weather. For example, weather 508 may specify avoiding certain levels of turbulence, storms, icing conditions, or other suitable types of weather conditions.

The illustration of goals 500 are only depicted as examples. These goals may be selected individually or in combination. Further goals that are selected from goals 500 may be ranked according to importance for use in selecting routes in these illustrative examples.

The illustration of flight plan management environment 100 and the components in flight plan management environment 100 in FIGS. 1-5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, flight plan manager 104 may be in a single location or in multiple locations. In the illustrative examples, computer system 112 may be located at an airline, in an electronic flight bag, on a computer in aircraft 108, or in some other location. Further, database of routes 200 and aircraft model database 204 may be located in computer system 112 or may be located in some other computer system that is remote to computer system 112.

Figure 6:
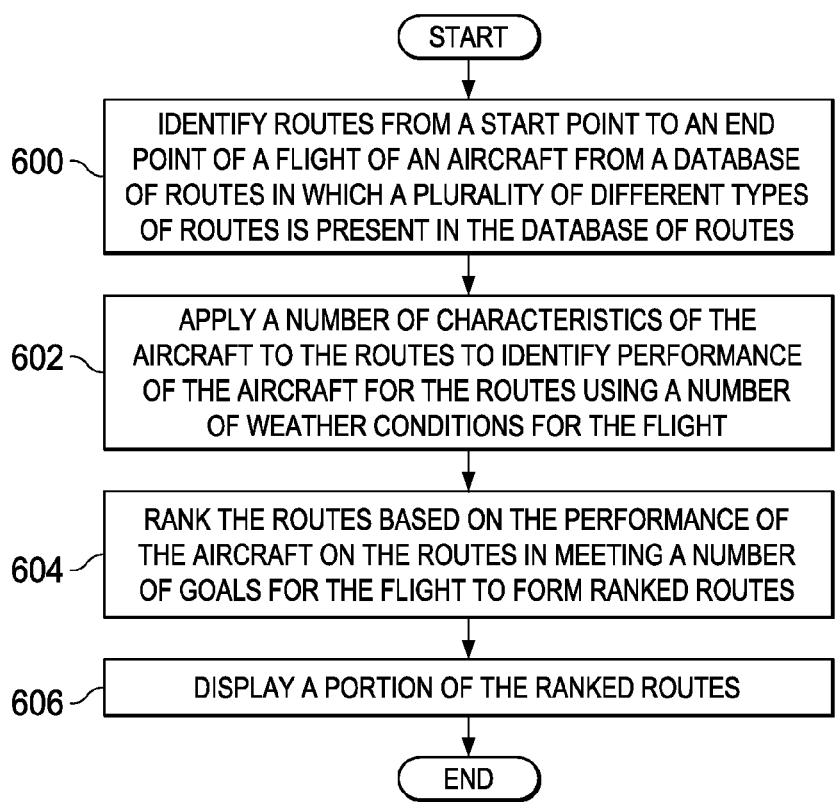
FIG. 6 is an illustration of a flowchart of a process for flight planning in accordance with an illustrative embodiment.

With reference now to FIG. 6, an illustration of a flowchart of a process for flight planning is depicted in accordance with an illustrative embodiment. The process illustrated in FIG. 6 is an example of operations that may be implemented in flight plan manager 104 in FIGS. 1 and 2.

The process begins by identifying routes from a start point to an end point of a flight of an aircraft from a database of routes in which a plurality of different types of routes is present in the database of routes (operation 600). The process then applies a number of characteristics of the aircraft to the routes to identify performance of the aircraft for the routes using a number of weather conditions for the flight (operation 602).

The routes are ranked based on the performance of the aircraft on the routes in meeting a number of goals for the flight to form ranked routes (operation 604). A portion of the ranked routes is displayed (operation 606) with the process terminating thereafter. The portion of the selected ranked routes may vary in different implementations. Depending on the number of ranked routes identified, the portion of the ranked routes may be all of the ranked routes or some subset of the ranked routes.

The portion of the ranked routes may be selected in a number of different ways. For example, the portion of the ranked routes may be selected as two, three, five, ten, or some other number of routes having the highest ranking in the ranked routes.

Figure 7:
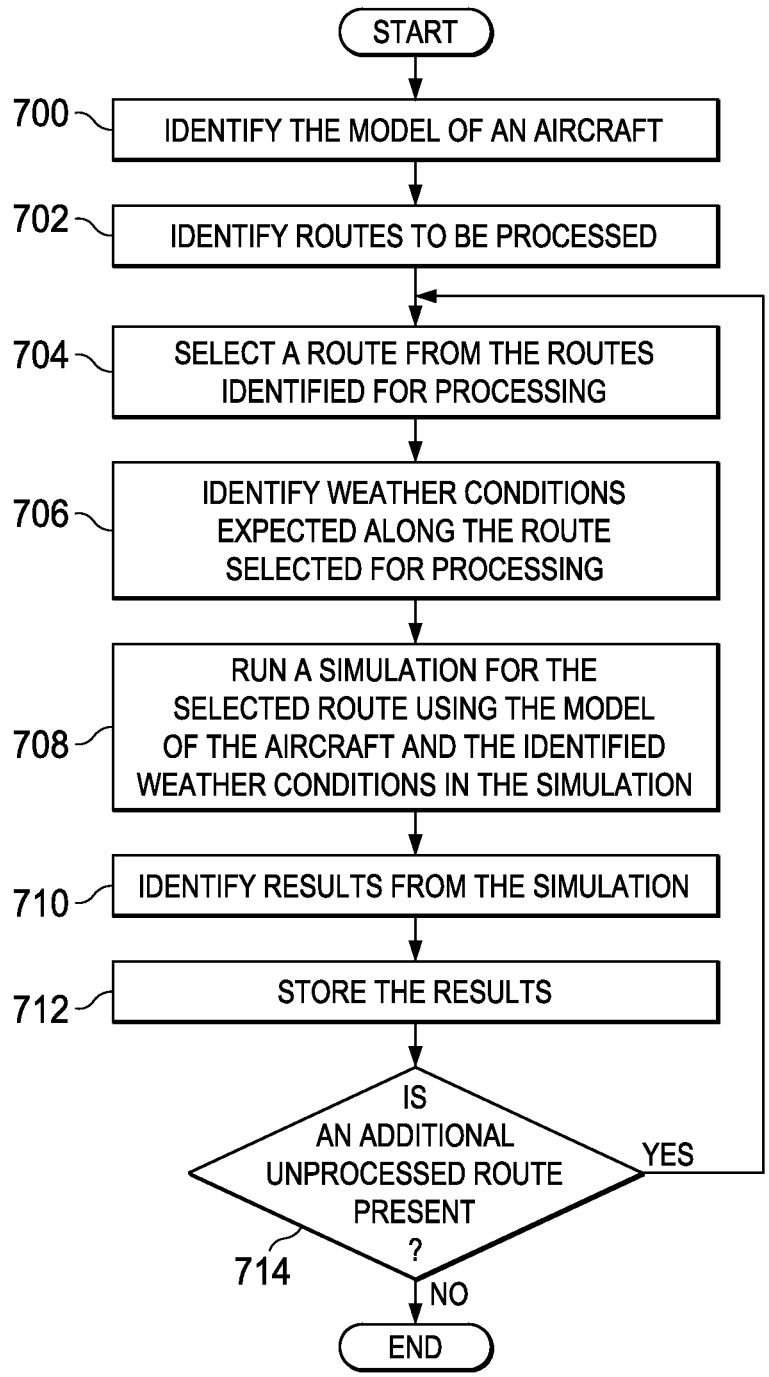
FIG. 7 is an illustration of a flowchart of a process for applying characteristics of an aircraft to routes for a flight plan to identify a performance of the aircraft in accordance with an illustrative embodiment.

Turning now to FIG. 7, an illustration of a flowchart of a process for applying characteristics of an aircraft to routes for a flight plan to identify a performance of the aircraft is depicted in accordance with an illustrative embodiment. The process illustrated in FIG. 7 is an example of one manner in which operation 602 in FIG. 6 may be implemented.

The process begins by identifying a model of the aircraft (operation 700). In this illustrative example, the model of the aircraft is used to identify a number of characteristics for the aircraft. Further, the model may be a model for the type of the aircraft or may be a model based on the actual performance of the aircraft.

The process then identifies routes to be processed (operation 702). A route from the routes identified is selected for processing (operation 704). The process identifies weather conditions expected along the route selected for processing (operation 706). These weather conditions may be actual weather conditions or predicted weather conditions. The weather conditions are identified for a departure time and an arrival time of the aircraft along the route.

In these illustrative examples, the departure time for identifying weather conditions may be input by the operator. The simulation may identify the period of time following the departure time for use in identifying predicted weather conditions for the simulation.

The process then runs a simulation for the selected route using the model of the aircraft and the identified weather conditions in the simulation (operation 708). Thereafter, the process identifies results from the simulation (operation 710). These results include a performance of the aircraft on the route based on the characteristics of the aircraft and the weather conditions expected along the route. The process stores the results (operation 712).

A determination is then made as to whether an additional unprocessed route is present from the routes identified (operation 714). If an additional route is present, the process returns to operation 704 to select another route for processing. Otherwise, the process terminates.

Figure 8:
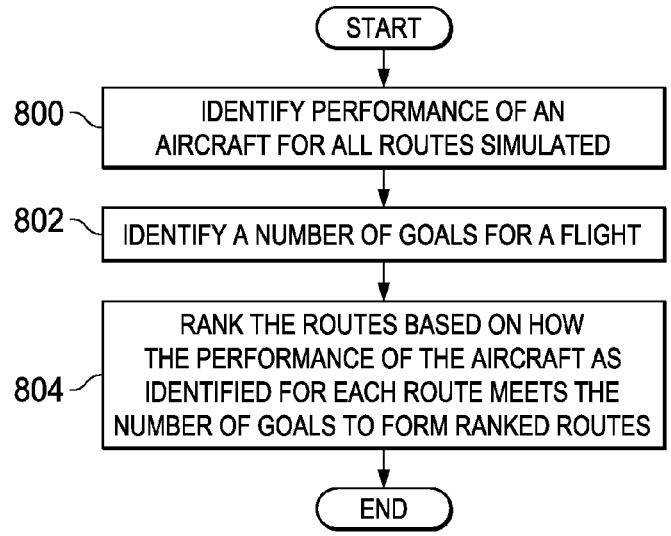
FIG. 8 is an illustration of a flowchart of a process for ranking routes for a flight plan based on performance of the aircraft on the routes in accordance with an illustrative embodiment.

Turning now to FIG. 8, an illustration of a flowchart of a process for ranking routes for a flight plan based on performance of the aircraft on the routes is depicted in accordance with an illustrative embodiment. The process illustrated in FIG. 8 is an example of one implementation for operation 604 in FIG. 6.

The process begins by identifying performance of an aircraft for all routes simulated (operation 800). The performances may be identified from the results.

The process then identifies a number of goals for a flight (operation 802). Thereafter, the process ranks the routes based on how the performance of the aircraft as identified for each route meets the number of goals to form ranked routes (operation 804) with the process terminating thereafter.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 9:
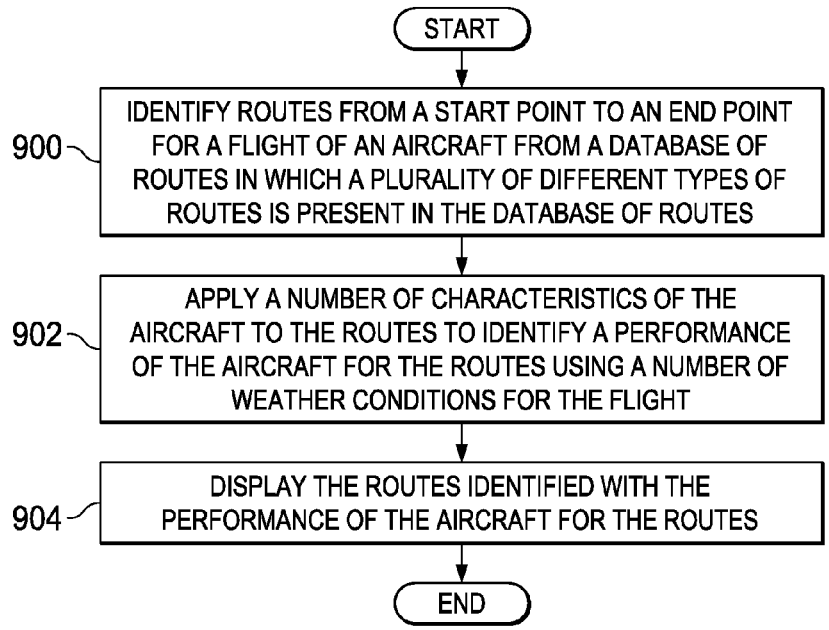
FIG. 9 is an illustration of a flowchart of a process for flight planning in accordance with an illustrative embodiment.

Turning now to FIG. 9, an illustration of a flowchart of a process for flight planning is depicted in accordance with an illustrative embodiment. The process illustrated in FIG. 6 is an example of operations that may be implemented in flight plan manager 104 in FIGS. 1 and 2. In this illustrative example, the routes are identified but not ranked on performance.

The process begins by identifying routes from a start point to an end point for a flight of an aircraft from a database of routes in which a plurality of different types of routes is present in the database of routes (operation 900). The process then applies a number of characteristics of the aircraft to the routes to identify a performance of the aircraft for the routes using a number of weather conditions for the flight (operation 902).

The process then displays the routes identified with the performance of the aircraft for the routes (operation 904) with the process terminating thereafter. In this manner, an operator planning a flight for an aircraft may see different possible routes that may be used in a flight plan for the aircraft. In particular, the operator may see many different types of routes that may be potentially available for use in creating a flight plan.

Turning now to FIG. 10, an illustration of a data processing system is depicted in accordance with an illustrative embodiment. Data processing system 1000 may be used to implement one or more computers in computer system 112 in FIG. 1. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these illustrative examples. In one example, computer readable media 1020 may be computer readable storage media 1024 or computer readable signal media 1026.

In these illustrative examples, computer readable storage media 1024 is a physical or tangible storage device used to store program code 1018 rather than a medium that propagates or transmits program code 1018.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1000 are not meant to provide architectural limitations to the manner in which different embodiments may be implemented. The different illustrative embodiments may be implemented in a data processing system including components in addition to and/or in place of those illustrated for data processing system 1000. Other components shown in FIG. 10 can be varied from the illustrative examples shown. The different embodiments may be implemented using any hardware device or system capable of running program code 1018.

Thus, the illustrative embodiments provide a method and apparatus for selecting routes for use in generating a flight plan. In these illustrative examples, flight plan manager 104 is configured to consider multiple types of routes rather than a single type of route. In other words, flight plan manager 104 may consider routes that have been previously cleared. Previously cleared routes may be compared to other types of routes to identify routes that may be best suited for a particular flight of an aircraft.

Additionally, flight plan manager 104 may run simulations 216 for routes that have been identified. In other words, these simulations may simulate the performance of actual flight plans using the routes that may be used for flight of an aircraft. The simulation identifies the performance of the aircraft using models of the aircraft. The models may be as specific as a model for a particular aircraft. With these models and the different types of flights, the performance of the aircraft may be identified. The performance may be compared against goals for the flight rather than merely selecting a route that has been cleared for use most frequently.

By running simulations, routes that may employ speeds and altitudes that are not usable by the aircraft may be avoided. Further with the simulations, undesired weather conditions also may be avoided.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for flight planning, the method comprising:
   identifying routes from a start point to an end point for a flight of an aircraft from a database of routes in which a plurality of different types of routes is present in the database of routes, wherein the plurality of different types of routes comprises previously cleared routes, previously flown routes, preferred routes, and airways wherein the previously flown routes are routes specifically flown by the aircraft or another aircraft of the same type;
   identifying a model of the aircraft and a number of characteristics of the aircraft, the number of characteristics comprising actual characteristics of the specific aircraft including fuel usage and speed;

running on a processor simulations that identify a period of time following a departure for the routes using the number of characteristics of the aircraft, a number of weather conditions expected along each of the routes, and a number of conditions of the flight including payload and fuel load the number of weather conditions comprises predicted weather conditions;

identifying on the processor a performance of the aircraft for the routes from the simulations of the routes using the number of weather conditions for the flight and the number of characteristics of the aircraft;

ranking the routes based on the performance of the aircraft on the routes in meeting a number of goals for the flight to form ranked routes; and displaying a portion of the ranked routes.

2. The method of claim 1 further comprising:
receiving a selection of a route from the portion of the ranked routes displayed; and
submitting the route selected for approval.

3. The method of claim 1, wherein the plurality of different types of routes further comprises a coded departure route, a high altitude design route, a non-restricted route, and ocean tracks.

4. The method of claim 1, wherein the number of goals is selected from at least one of fuel efficiency, speed, comfort level, and likelihood of clearance.

5. The method of claim 1, wherein identifying the routes from the start point to the end point for the flight comprises:
identifying flight plans containing the routes.

6. The method of claim 1, wherein the start point is selected from one of an airport, a current position of the aircraft, and a waypoint in a current route of the aircraft.

7. The method of claim 1 further comprising:
performing the flight using a flight plan with a route selected from the portion of the ranked routes meeting the number of goals for the flight.

8. The method of claim 1, wherein the number of weather conditions for the flight further comprises at least one of wind, precipitation, storms, and current weather conditions.

9. The method of claim 1 further comprising: identifying a number of goals for a flight and ranking the routes based on how the performance of the aircraft as identified for each route meets the number of goals.

10. The method of claim 9, wherein the number of goals comprises fuel efficiency, speed, comfort level, likelihood of clearance, fuel use, and travel time.

11. The method of claim 1,
wherein the number of characteristics comprises fuel usage, speed, and turning capabilities.

12. A method for flight planning, the method comprising:
identifying routes from a start point to an end point for a flight of an aircraft from a database of routes in which a plurality of different types of routes is present in the database of routes, wherein the plurality of different types of routes comprises previously cleared routes, previously flown routes, preferred routes, and airways wherein the previously flown routes are routes previously flown by the aircraft or another aircraft of the same type;
identifying a model of the aircraft and a number of characteristics of the aircraft, the number of characteristics comprising actual characteristics of the specific aircraft including fuel usage and speed;
running on a processor simulations that identify a period of time following a departure for the routes using the number of characteristics of the aircraft, a number of weather conditions expected along each of the routes, and a number of conditions of the flight including payload and fuel load, the number of weather conditions comprising both current weather conditions and predicted weather conditions;
identifying on the processor a performance of the aircraft for the routes from the simulations of the routes using the number of weather conditions for the flight and the number of characteristics of the aircraft; and
displaying the routes identified with the performance of the aircraft for the routes.

13. The method of claim 12 further comprising:
receiving a selection of a route from the routes displayed; and
submitting the route selected for approval to air traffic control.

14. The method of claim 12, wherein the start point is selected from one of an airport, a current position of the aircraft, and a waypoint in a current route of the aircraft.

15. An apparatus comprising:
a flight plan manager configured to:
identify routes from a start point to an end point for a flight of an aircraft from a database of routes in which a plurality of different types of routes is present in the database of routes, wherein the plurality of different types of routes comprises previously cleared routes, previously flown routes, preferred routes, and airways wherein the previously flown routes are routes previously flown by the aircraft or another aircraft of the same type;
identify a model of the aircraft and a number of characteristics of the aircraft, the number of characteristics comprising actual characteristics of the specific aircraft including fuel usage and speed;
run on a processor simulations that identify a period of time following a departure for the routes using the number of characteristics of the aircraft, a number of weather conditions expected along each of the routes, and a number of conditions of the flight including payload and fuel load, the number of weather conditions comprising both current weather conditions and predicted weather conditions;
identify on the processor a performance of the aircraft for the routes from the simulations of the routes using the number of weather conditions for the flight and the number of characteristics of the aircraft;
rank the routes based on the performance of the aircraft on the routes in meeting a number of goals for the flight to form ranked routes; and
display a portion of the ranked routes.

16. The apparatus of claim 15, wherein the flight plan manager is further configured to receive a selection of a route from the portion of the ranked routes displayed and submit the route selected for approval.

17. The apparatus of claim 15, wherein the plurality of different types of routes further comprises a coded departure route, a high altitude design route, a non-restricted route, and ocean tracks.

18. The apparatus of claim 15, wherein the number of goals is selected from at least one of fuel use, travel time, and likelihood of clearance.

19. The apparatus of claim 15, wherein the start point is selected from one of an airport, a current position of the aircraft, and a waypoint in a current route of the aircraft.

20. The apparatus of claim 15, wherein the number of goals is selected from at least one of fuel efficiency, speed, comfort level, and likelihood of clearance.

* * * * *